(12) United States Patent
Tyler

(10) Patent No.: US 7,006,238 B1
(45) Date of Patent: Feb. 28, 2006

(54) PRINT ENABLEMENT IN SOFTWARE SYSTEMS

(75) Inventor: Stephen Leslie Tyler, West Pennant Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/323,993

(22) Filed: Jun. 2, 1999

(30) Foreign Application Priority Data

Jun. 12, 1998 (AU) .................................... PP4071

(51) Int. Cl.
*G06F 15/00* (2006.01)
(52) U.S. Cl. .................... 358/1.13; 358/1.1; 358/1.2; 358/1.15
(58) Field of Classification Search ............ 358/1.12, 358/1.13, 1.14, 1.15, 1.18, 1.1, 1.2, 407; 707/517, 523
See application file for complete search history.

(56) References Cited

U.S. PATENT DOCUMENTS

| | | | |
|---|---|---|---|
| 5,109,413 A | | 4/1992 | Comerford et al. ............ 380/4 |
| 5,689,560 A | | 11/1997 | Cooper et al. ................ 380/4 |
| 5,790,664 A | * | 8/1998 | Coley et al. ................ 709/203 |
| 5,819,092 A | * | 10/1998 | Ferguson et al. ............ 717/113 |
| 5,907,617 A | | 5/1999 | Ronning ........................ 380/4 |
| 6,029,182 A | * | 2/2000 | Nehab et al. ................ 715/523 |
| 6,061,700 A | * | 5/2000 | Brobst et al. ................ 715/517 |
| 6,222,634 B1 | * | 4/2001 | Dubbels et al. ............ 358/1.15 |
| 6,229,622 B1 | * | 5/2001 | Takeda ...................... 358/1.16 |
| 6,268,926 B1 | * | 7/2001 | Okimoto et al. ........... 358/1.15 |
| 6,314,432 B1 | * | 11/2001 | Potts, Jr. .................. 707/104.1 |
| 6,320,671 B1 | * | 11/2001 | Kelley et al. .............. 358/1.18 |
| 6,362,897 B1 | * | 3/2002 | Berg et al. .................. 358/1.6 |
| 2002/0171872 A1 | * | 11/2002 | Matsunaga ................ 358/1.18 |
| 2003/0048471 A1 | * | 3/2003 | Lundgren .................. 358/1.15 |
| 2003/0142801 A1 | * | 7/2003 | Pecht ..................... 379/100.01 |

* cited by examiner

*Primary Examiner*—Mark Wallerson
(74) *Attorney, Agent, or Firm*—Fitzpatrick, Cella, Harper & Scinto

(57) ABSTRACT

A method for manipulating an electronic document automatically created by an application program is disclosed. The method comprises the step of identifying a user involved manipulation of the electronic document to determine if the invoked manipulation is one of a predetermined group of manipulations. If the invoked manipulation is not a member of the group, then the invoked manipulation is allowed to proceed. However, if the invoked manipulation is a member of the group, then the manipulation is allowed to proceed only in respect of predetermined portion of the electronic document.

28 Claims, 4 Drawing Sheets

PRINT ENABLEMENT IN SOFTWARE SYSTEMS

FIELD OF THE INVENTION

The present invention relates to computer-based facility enablement and, in particular, to the availability of computer printing facilities.

BACKGROUND OF THE INVENTION

Seldom in human history have people adopted a communications technology so widely and rapidly as users of the Internet have embraced the World Wide Web.

The Internet provides an ever increasing potential for information interchange, and in order to encourage individuals to take part in this communications revolution, many software providers supply free demonstration versions of their software on-line, sometimes called Free-ware and Share-ware. Individuals may dial-up the home page of a supplier and access the demonstration software for trial purposes. This may even involve down-loading the software onto the personal computer of the individual.

Free-ware and share-ware are attractive forms of software in marketing. However, one drawback in supplying software in this manner is that many never actually subscribe to buy the full version of the software continuing to utilise the demonstration version, which is sometimes powerful in its own right. Many software providers are therefore discouraged to provide demonstration versions of their software on-line.

It is an object of the present invention to substantially overcome, or at least ameliorate, one or more of the problems mentioned above.

SUMMARY OF THE INVENTION

In accordance with one aspect of the present invention there is disclosed a method for manipulating an electronic document automatically created by an application program, said method comprising the steps of:

identifying a user involved manipulation of said electronic document to determine if said invoked manipulation is one of a predetermined group of manipulations; wherein if said invoked manipulation is not a member of said group, allowing said invoked manipulation to proceed; or if said invoked manipulation is a member of said group, allowing said manipulation to proceed only in respect of a predetermined portion of said electronic document.

Other aspects of the invention will be apparent from the following description.

DESCRIPTION OF THE PREFERRED EMBODIMENT

Figure 1:
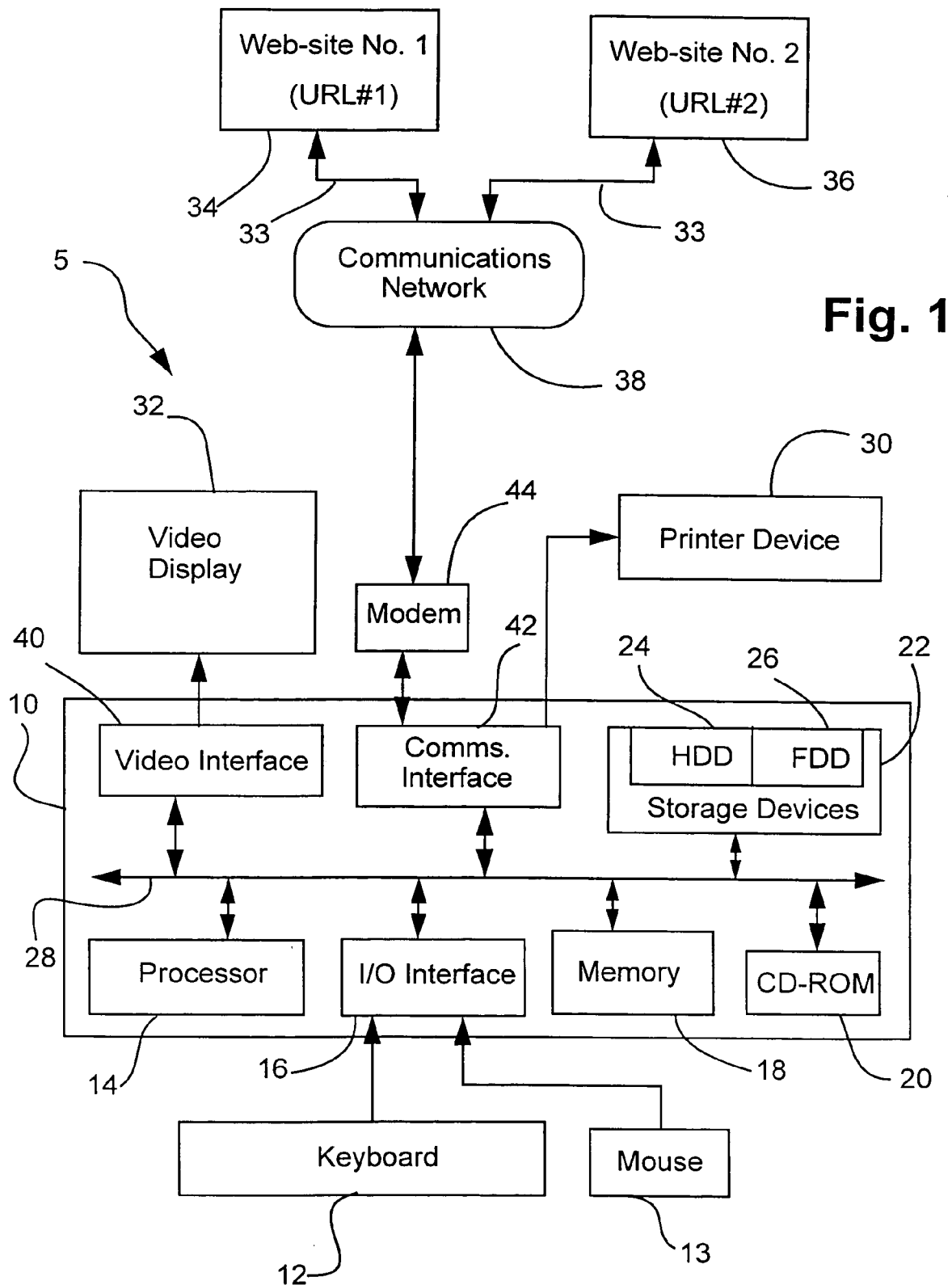
FIG. 1 is a block diagram of a computer system and network with which the preferred embodiment of the present invention can be practised.

In order to access the Internet and traverse the World Wide Web, use is often made of special browsing software such as Microsoft Internet Explorer (Microsoft Corporation) or Netscape Navigator (Netscape Corporation). On entering a web site or some other location, various computer facilities become available to the user in order to manipulate data, programs and the like. Such facilities include the printing of data, copying, running software, listening to audio and receiving video data, amongst others. This may include or result in using Free-ware or Share-ware.

To assist users in being able to track and trace their traversal of the Web, Canon Information Systems Research Australia Pty Ltd has developed a product marketed under the trade mark WebRecord which is currently the subject of U.S. patent application Ser. No. 08/903,743 filed 31 Jul. 1997. WebRecord operates in a background mode behind the browsing software to automatically and transparently create a printable document that includes the various Web sites and documents encountered by a user during a traversal of the Web.

The preferred embodiment of the present invention is implemented as an additional feature in WebRecord and has been developed to facilitate the marketing of WebRecord. However, the present invention is not limited to use with WebRecord or other similar products, but has wider application and may for example be implemented in the browsing software, as will be appreciated by those skilled in the art having read and understood this specification.

The preferred embodiment is practised using a general-purpose computer system 5 connectable to a communication network 38 which provides links 33 to web sites 34 and 36. The computer system 5 includes a computer module 10, input devices such as a keyboard 12 and mouse 13, output devices including a printer 30 and a video display device 32. A modulator-demodulator (modem) transceiver device 44 is used by the computer module 10 for communicating to and from computer systems at other locations via the communications network 38, those computer systems for example include the web sites 34 and 36.

The computer module 10 has a number of components typically including at least one processor unit 14, a memory unit 18, for example formed from semiconductor random access memory (RAM) and read only memory (ROM), input/output (I/O) interfaces including a video interface 40, an I/O interface 16 for the keyboard 12 and mouse 13 and a communications interface 42 for the modem 44. A storage device 22 is provided and typically includes a hard disk drive 24 and a floppy disk drive 26. A CD-ROM drive 20 is typically provided as a non-volatile source of data. The components of the computer module 10 typically communicate via an interconnected bus 28 and in a manner which results in a conventional mode of operation of the computer system known to those in the relevant art. Examples of such computer systems 5 include IBM PC/AT and similar machines, Sun Sparkstations and Apple Macintosh. Further, web-sites 34 and 36 may be implemented on such computer systems.

During an Internet or Web browsing session, a user of the computer system 5 enables operation of the browsing software which is typically stored in the hard disk drive 24 and which facilitates communications via the modem to provide a connection to a web-site.

Locations accessible via the communications network 38 are individually addressable using a Uniform Resource Locater (URL), well known in the art. The URL thus may be entered by the user of the computer system 5 to directly access a particular web-site. Alternatively, web-site documents and the like (including search engines) may include hyper-text which, when selected, provide direct links to locations identified by URL's associated with the hyper-text.

Figure 2:
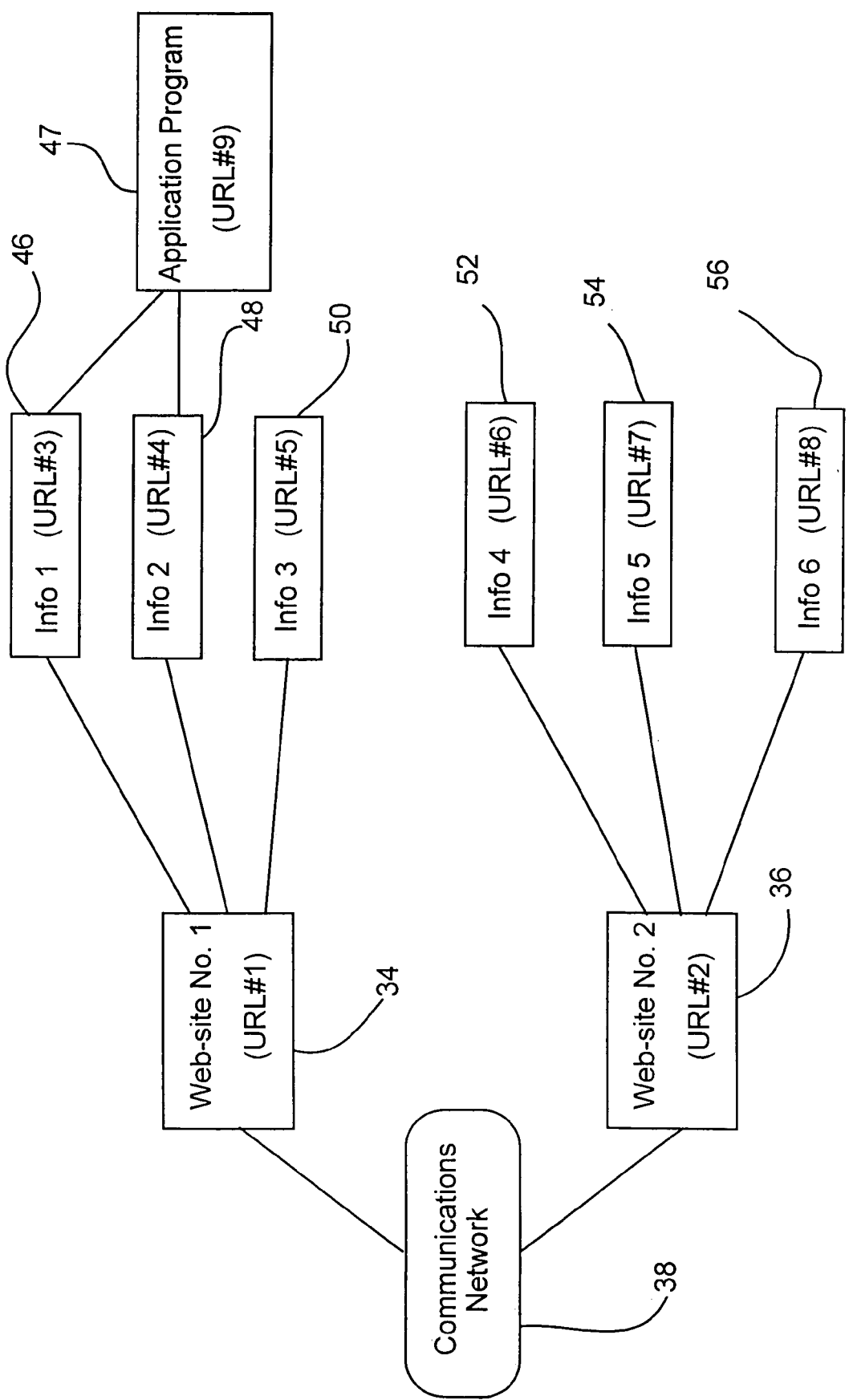
FIG. 2 is a detailed block diagram of two world-wide web site structures.

FIG. 2 shows a block diagram representation of two Internet web-sites 34,36 and their associated URL's. The computer module 10 can access the web-sites 34 and 36 via the modem 44 and communications network 38. The web-sites 34,36 can be accessed through both direct and indirect Internet connections, and through a variety of browsers. As seen in FIG. 2, web-site 34 provides access to information locations 46, 48 and 50 each of which has its own unique URL as illustrated. Similarly, web-site 36 access three information locations 52, 54 and 56 also having respective URL's.

It will be appreciated that the information accessed via the various URL's may include any combination of text, images, graphic objects, programs, raw data such as audio data and video data, for example. It is further seen from FIG. 2 that a location 47, accessible via location 46 or location 48 and having a unique URL (URL #9), includes an application program.

In the preferred embodiment, a demonstration version of WebRecord is made available to the public as the application program 47 and for which persons entering Web-site No. 1 have access. The application program 47 may be downloaded to the user's computer system 5 to enable the demonstration of WebRecord to be undertaken.

In the preferred embodiment, users of the demonstration version of WebRecord are free to make use of that program to generate an electronic document suitable for printing on the printer device 30. Typically, the electronic document would incorporate portions sourced from a variety of locations on the Internet and World Wide Web and generated from a single browsing session.

However, in the described embodiments, so as to encourage experimentation and evaluation of the application program, but whilst preventing substantial practical use of the application program, the user is limited in respect of the printing of the electronic document. For example, the electronic document created by WebRecord is created containing, say, fifteen printable pages, the one embodiment permits the user, on any single printing call, to print only three pages. Accordingly, if the user wishes to print all fifteen pages, the user must perform five separate printing calls in order for the entire document to be printed. In an alternative embodiment, where the electronic document includes material sourced from a number of web locations, as defined by their URL's, printing is limited to only those portions sourced from a predetermined number of URL's.

In this fashion, the user is enabled to view the capacity of the software being trialed and print examples of the document created by the software, but is precluded from convenient use of the software through being limited in application.

Figure 3:
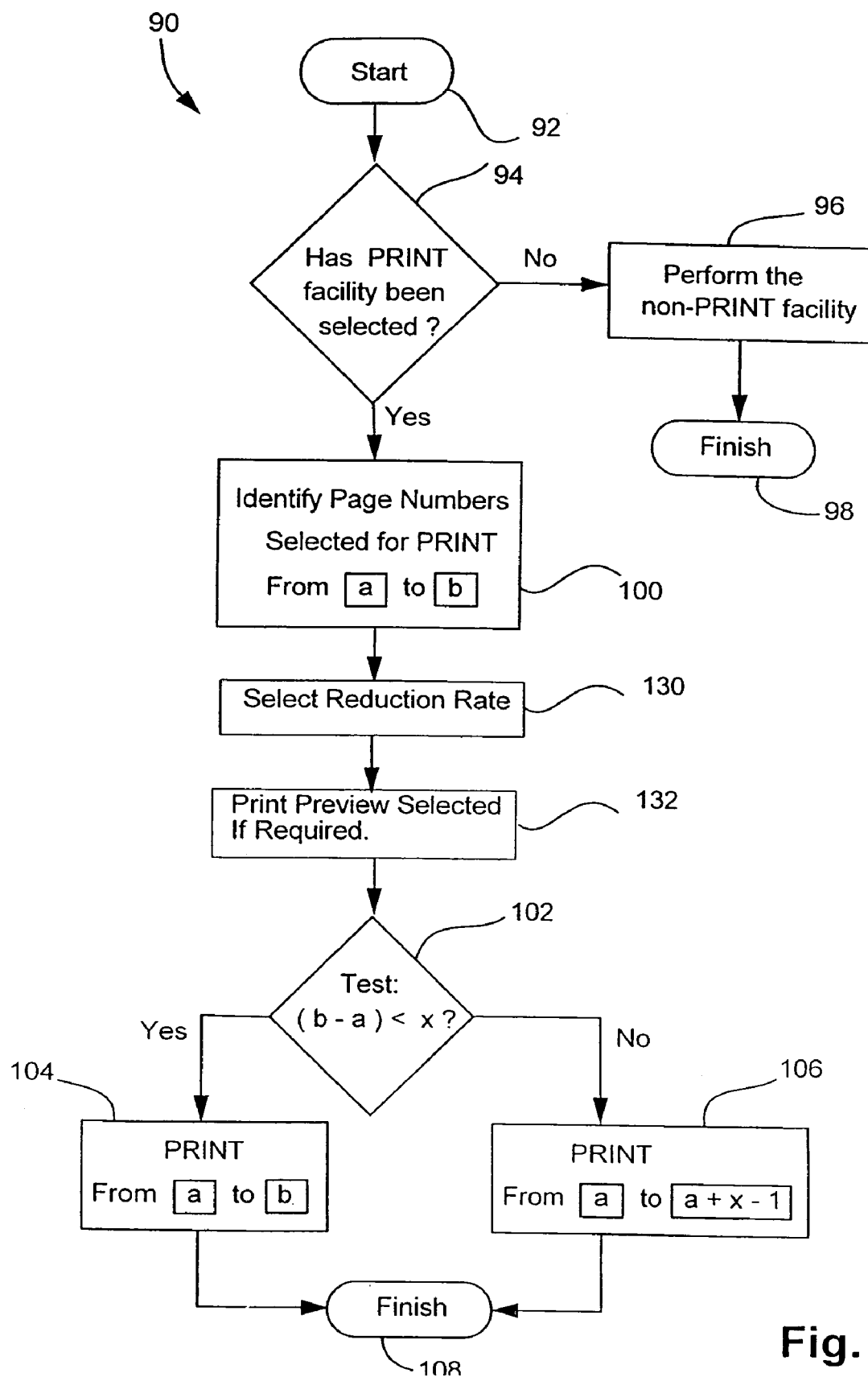
FIG. 3 is a flow chart depicting operation of a print facility management system of one embodiment.

FIG. 3 provides a flow chart of how one embodiment operates which illustrates a series of method steps 90 which commences with a start step 92 followed a decision step 94 which examines whether or not a print facility has been selected. If no such facility has been selected, control passes to step 96 which enables performance of the non-print facility, which concludes at step 98. An example of such a non-print facility may be "PrintPreview".

If print facility have been selected, this embodiment implements a step 100 which identifies those specific page numbers of the electronic document selected to be printed. As is usual in most print packages and the like, the user is able to select those particular pages from a multi-page document desired to be printed. In step 100, the preferred embodiment determines that the user has selected to print from page number "a" to page number "b". The process continues at step 130, where the user can select a printing reduction rate. For example, the user can select to print all the selected pages on one A4 size page. At the next step 132, the user can select a "print preview" function in order to preview the printed pages on screen before actual printing occurs.

Control then passes to step 102 where a test is performed to determine the actual number of pages that have been selected and whether or not they are within the criteria established by the particular embodiment. In this case, page number "b" is subtracted from page number "a" and a test of whether or not that this less than a predetermined number of pages "x" is correct. If this is true, control passes to step 104 where printing from page number "a" to page number "b" inclusive is enabled, this corresponding to the user request.

If the test of 102 is not satisfied, control passes to step 106 where only a predetermined number of pages from page "a" are printed. In this case, step 106 identifies the calculation used to determine the total number of pages printed for an arbitrary value of "x". Control from each of steps 104 and 106 passes to a finishing step 108. In both steps 104 and 106 a print preview will occur if one has been requested by the user at step 132. In a preferred implementation of this embodiment, the value of "x" is 3.

Figure 4:
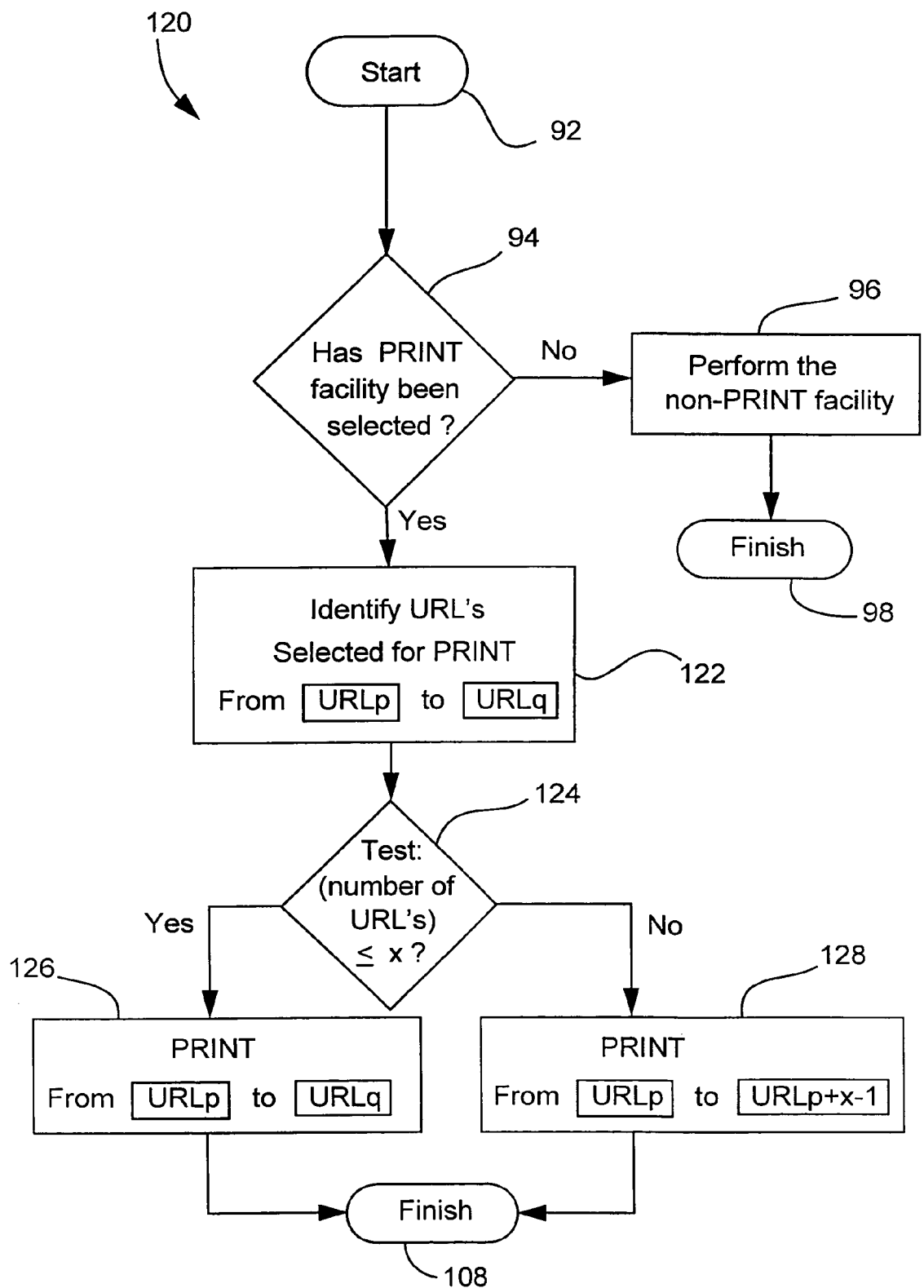
FIG. 4 is a flow chart depicting another operation of a print facility management system of one embodiment.

FIG. 4 illustrates method steps 120 associated with the alternative embodiment mentioned above and which in many respects corresponds to the embodiment of FIG. 3 and in particular corresponding method steps have been given like reference numerals and to which it is noted the corresponding description applies. In the method 120, if print has been selected in step 94, step 122 prompts the user to identify those particular URL's of the multi-URL formatted document desired to be printed. In this embodiment these are identified as URLp and URLq. In step 124, the actual number of URL's to be selected for printing by the user is tested, again against an arbitrary number "x". If the number of URL's is less than or equal to the arbitrary number "x", control is passed to step 126 which prints the URL's selected by the user in step 122. If however the number of URL's exceeds the predetermined value "x", control passes to step 128 where printing is enabled from URLp to URLp+x−1 thereby limiting the total number of URL's to be printed to be the number "x".

With the alternative embodiment of FIG. 4, printing of the electronic document occurs independent of the number of pages that span the document and the number of pages which might be occupied by each URL.

For example, in a preferred implementation of WebRecord, information sourced from a number of URL's may appear on a single page of the printable document. In the alternative embodiment of FIG. 4, only the data sourced from a predetermined number of those URL's (eg. 3) is printed.

At steps 126 and 128 of FIG. 4, in one particular embodiment, when printing is enabled in each of the URL's identified by the user, control is passed to step 100 of FIG. 3 to identify those specific page numbers of each URL to be printed. For example, if data sourced from URLp is being printed at step 126 of FIG. 4, control will pass to step 100 of FIG. 3 and the preferred embodiment will determine that the user has selected to print from page number "a" to page number "b" of URLp. Control then passes to step 102 where a test is performed to determine the actual number of pages that have been selected and whether or not they are within the criteria established by the particular embodiment. Control then passes to either of steps 104 or 106 depending on the outcome of the test at step 102. Control from each of steps 104 and 106 will then pass back to step 126 to print the data from the next URL. This process will finish when the data from URLq is printed and control passes to step 108 of FIG. 4. In this fashion, the user is restricted to printing a certain number of pages from each URL. Thus again, experimentation and evaluation of the application program is encouraged, whilst preventing substantial practical use of the application program.

The foregoing provides a number of advantages over prior art software trialing systems. For example, many software trialing system enable printing of a product produced using the software but the printing is in some way obscured for example with the word "demo" printed in the background of the desired image thus detracting from the usefulness of the printed document. By enabling the user to print only a predetermined number of pages or a predetermined number of URL's, the user is able to utilise the trialed software for valuable purposes in order to assess its desirability for purchase. However, by using the print restriction feature of the described embodiment, multiple use of the application software is hampered and thus the user is enticed to obtain a production version of the software.

The foregoing describes only one embodiment of the present invention and modifications, obvious to those skilled in the art can be made thereto without departing from the scope of the invention.

The claims defining the invention are as follows:

1. A method for manipulating an electronic document automatically created by an application program, said method comprising the steps of:
   identifying a user invoked manipulation of said electronic document to determine if said invoked manipulation is one of a predetermined group of manipulations, wherein if said invoked manipulation is not a member of said group, allowing said invoked manipulation to proceed, or if said invoked manipulation is a member of said group, allowing said manipulation to proceed in respect of a predetermined portion of said electronic document, wherein said predetermined portion is defined by a provider of said application program.

2. A method according to claim 1, wherein said predetermined portion comprises a predetermined number of pages of said electronic document.

3. A method according to claim 1, wherein said group includes a printing function.

4. A method according to claim 3, wherein said printing function is the only member of said group.

5. A method according to claim 3, wherein said printing function includes a print reduction function.

6. A method according to claim 3, wherein said printing function includes a print preview function.

7. A method according to claim 1, wherein said electronic document represents a conglomeration of user selected electronic documents obtained via a traversal of a computer network.

8. A method according to claim 7, wherein said predetermined portion comprises a predetermined number of said selected documents.

9. A method according to claim 8, wherein associated with each said selected document of said conglomeration is a document location identifier, and said predetermined portion is determined using said document location identifiers.

10. A method according to claim 7, wherein said manipulation is allowed to proceed only in respect of a predetermined portion of each said electronic documents.

11. A method according to claim 10, wherein said predetermined portion comprises a predetermined number of pages of an electronic document.

12. A method according to claim 7, wherein said group includes a printing function.

13. A method according to claim 1, wherein said provider is a developer and/or supplier of said application program.

14. An apparatus for manipulating an electronic document automatically created by an application program, said apparatus comprising:
   identifying means for identifying a user invoked manipulation of said electronic document to determine if said invoked manipulation is one of a predetermined group of manipulations;
   allowing means for allowing said invoked manipulation to proceed if said invoked manipulation is not a member of said group; or if said invoked manipulation is a member of said group, allowing said manipulation to proceed in respect of a predetermined portion of said electronic document, wherein said predetermined portion is defined by a provider of said application program.

15. An apparatus according to claim 14, wherein said provider is a developer and/or supplier of said application program.

16. A computer program product comprising a computer usable medium having computer readable program code means embodied in said medium for manipulating an electronic document automatically created by an application program, said product including:
   identifying means for identifying a user invoked manipulation of said electronic document to determine if said invoked manipulation is one of a predetermined group of manipulations;
   allowing means for allowing said invoked manipulation to proceed if said invoked manipulation is not a member of said group; or if said invoked manipulation is a member of said group, allowing said manipulation to proceed in respect of a predetermined portion of said electronic document, wherein said predetermined portion is defined by a provider of said application program.

17. A computer program product according to claim 16, wherein said predetermined portion comprises a predetermined number of pages of said electronic document.

18. A computer program product according to claim 16, wherein said group includes a printing function.

19. A computer program product according to claim 18, wherein said printing function is the only member of said group.

20. A computer program product according to claim 18, wherein said printing function includes a print reduction function.

21. A computer program product according to claim 18, wherein said printing function includes a print preview function.

22. A computer program product according to claim 16, wherein said electronic document represents a conglomeration of user selected electronic documents obtained via a traversal of a computer network.

23. A computer program product according to claim 22, wherein said predetermined portion comprises a predetermined number of said selected documents.

24. A computer program product according to claim 23, wherein associated with each said selected document of said conglomeration is a document location identifier, and said predetermined portion is determined using said document location identifiers.

25. A computer program product according to claim 22, wherein said manipulation is allowed to proceed only in respect of a predetermined portion of each said electronic documents.

26. A computer program product according to claim 25, wherein said predetermined portion comprises a predetermined number of pages of an electronic document.

27. A computer program product according to claim 22, wherein said group includes a printing function.

28. A computer program according to claim 16, wherein said provider is a developer and/or supplier of said application program.

* * * * *

UNITED STATES PATENT AND TRADEMARK OFFICE
CERTIFICATE OF CORRECTION

PATENT NO. : 7,006,238 B1  Page 1 of 1
APPLICATION NO. : 09/323993
DATED : February 28, 2006
INVENTOR(S) : Stephen Leslie Tyler It is certified that error appears in the above-identified patent and that said Letters Patent is hereby corrected as shown below:

ON THE COVER PAGE
At Item (57), Abstract, line 10, "of" (first occurrence) should read --of a--.

COLUMN 3
Line 15, "access" should read --provides access to--.
Line 66, "have" should read --has--.

COLUMN 5
Line 18, "system" should read --systems--.

COLUMN 6
Line 7, "each said" should read --each of said--.

COLUMN 8
Line 2, "each said" should read --each of said--.

Signed and Sealed this

Twenty-sixth Day of September, 2006

JON W. DUDAS
*Director of the United States Patent and Trademark Office*